(12) United States Patent
Farmer et al.

(10) Patent No.: US 7,123,169 B2
(45) Date of Patent: Oct. 17, 2006

(54) METHOD AND APPARATUS FOR COLLABORATIVE AGGREGATE SITUATION AWARENESS

(75) Inventors: Randolph Gregory Farmer, Rancho Palos Verdes, CA (US); William Mark Nichols, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 178 days.

(21) Appl. No.: 10/989,774

(22) Filed: Nov. 16, 2004

(65) Prior Publication Data

US 2006/0114324 A1    Jun. 1, 2006

(51) Int. Cl.
*G08B 21/00* (2006.01)

(52) U.S. Cl. ..................... 340/945; 455/431

(58) Field of Classification Search ................ 340/945, 340/539.14, 540; 455/431, 456.1, 456.6; 701/200, 214
See application file for complete search history.

(56) References Cited

U.S. PATENT DOCUMENTS

| | | | |
|---|---|---|---|
| 4,673,938 A | 6/1987 | Phillips et al. | |
| 4,814,711 A | 3/1989 | Olsen et al. | |
| 5,124,915 A | 6/1992 | Krenzel | |
| 5,458,041 A | 10/1995 | Sun et al. | |
| 5,587,904 A | 12/1996 | Ben-Yair et al. | |
| 6,018,659 A * | 1/2000 | Ayyagari et al. | 455/431 |
| 6,084,510 A | 7/2000 | Lemelson et al. | |
| 6,211,816 B1 | 4/2001 | Westphal | |
| 6,360,193 B1 | 3/2002 | Stoyen | |
| 6,385,434 B1 * | 5/2002 | Chuprun et al. | 455/11.1 |
| 6,437,727 B1 | 8/2002 | Lemelson et al. | |
| 6,542,076 B1 * | 4/2003 | Joao | 340/539.14 |
| 6,587,046 B1 * | 7/2003 | Joao | 340/539.14 |
| 6,792,684 B1 * | 9/2004 | Hyyppa | 33/1 A |
| 6,842,674 B1 * | 1/2005 | Solomon | 701/23 |
| 7,047,861 B1 * | 5/2006 | Solomon | 89/1.11 |
| 2002/0138663 A1 | 9/2002 | Ladwig | |
| 2002/0196248 A1 | 12/2002 | Kraus et al. | |

OTHER PUBLICATIONS

E. Riseman et al., "Daedalus Battlefield Visualization System," ARPA Image Understanding Workshop, Palm Springs, CA, 1996, pp. 1-10.
M. T. Fennell et al., "Battlefield Awareness Via Synergistic SAR and MTI Exploitation," *IEEE AES Magazine*, vol. 13, No. 2, Feb. 1998, pp. 1-6.

* cited by examiner

*Primary Examiner*—John Tweel, Jr.
(74) *Attorney, Agent, or Firm*—Robert P. Lenart, Esq.; Pietragallo, Bosick & Gordon LLP

(57) ABSTRACT

A surveillance method comprises the steps of: sending information requests to one or more of a plurality of unmanned airborne platforms, each carrying one or more sensors for gathering information; coordinating processing of the requests among the plurality of airborne platforms; and transmitting responses to the requests to one or more requesters. A surveillance system that can be used to perform the method is also provided.

19 Claims, 3 Drawing Sheets

METHOD AND APPARATUS FOR COLLABORATIVE AGGREGATE SITUATION AWARENESS

FIELD OF THE INVENTION

This invention relates to reconnaissance, surveillance and target acquisition systems, and more particularly to such systems that include multiple sensors.

BACKGROUND OF THE INVENTION

Reconnaissance, surveillance and target acquisition systems can include a plurality of airborne platforms or air vehicles, each carrying a plurality of sensors that are used to collect information about an area under surveillance. The airborne platforms can communicate with requesters, which can include persons or equipment, that desire access to data collected by the sensors.

Two primary factors in the operation of such surveillance systems are the time required to communicate among system components and users, and the positions of the sensors. In many cases requesters may not be aware of the location of the air vehicles, the availability of the sensors, and/or the tasking needs imposed on the vehicles or sensors. In addition, the sensors may not know the needs of the requesters in a timely manner.

Time is a factor since the human requesters may not be able to think as an aggregate nor visualize the whole requester/sensor configuration given multiple collecting platforms or systems of sensors. Communication bandwidth, the amount of data to be transmitted, and the distance the data must be communicated also affect response time.

There is a need for a situation awareness system that can provide optimal placement of sensors and reduced time for disseminating the collected information.

SUMMARY OF THE INVENTION

This invention provides a surveillance method comprising the steps of: sending information requests to one or more of a plurality of unmanned airborne platforms, each carrying one or more sensors for gathering information; coordinating processing of the requests among the plurality of airborne platforms; and transmitting responses to the requests to one or more requesters.

In another aspect, the invention encompasses a surveillance system comprising: a plurality of unmanned airborne platforms, each carrying one or more sensors for gathering information; a first plurality of communications links for transmitting a plurality of requests to the airborne platforms and for sending information to a plurality of requesters; and a second plurality of communications links for transmitting and receiving information between the plurality of airborne platforms to coordinate collection of data by the sensors.

DETAILED DESCRIPTION OF THE INVENTION

This invention relates to automatic systems for producing total situation awareness between a group of machines and/or human producers and a group of machine and/or human consumers by collaboration of the aggregate. The group of suppliers and requesters form an aggregate organization. As used herein, the term "aggregate" refers to the system as a whole, including the total of all the supply and demand components. The human producers may be pilots with cameras or sensors that gather requested pictures, while the machine producers may be unmanned air vehicles equipped with cameras or sensors.

The invention provides a fluid collaboration of the supply/demand aggregate in surveillance systems by providing requesters with a digestible knowledge of the total aggregate. The system includes auto sensors with the ability to predict sweet spot sensor positions for optimal tasking. For the purpose of this description, the system is referred to as a Collaborative Aggregate Situation Awareness (CASA) system. The CASA system uses machine power to automate some of the thought process and to provide for a more efficient exchange of demand and supply or the more efficient use of system resources. The total flow of product to consumer is more efficient than having the individual producer and consumer trying to produce or consume by themselves.

Figure 1:
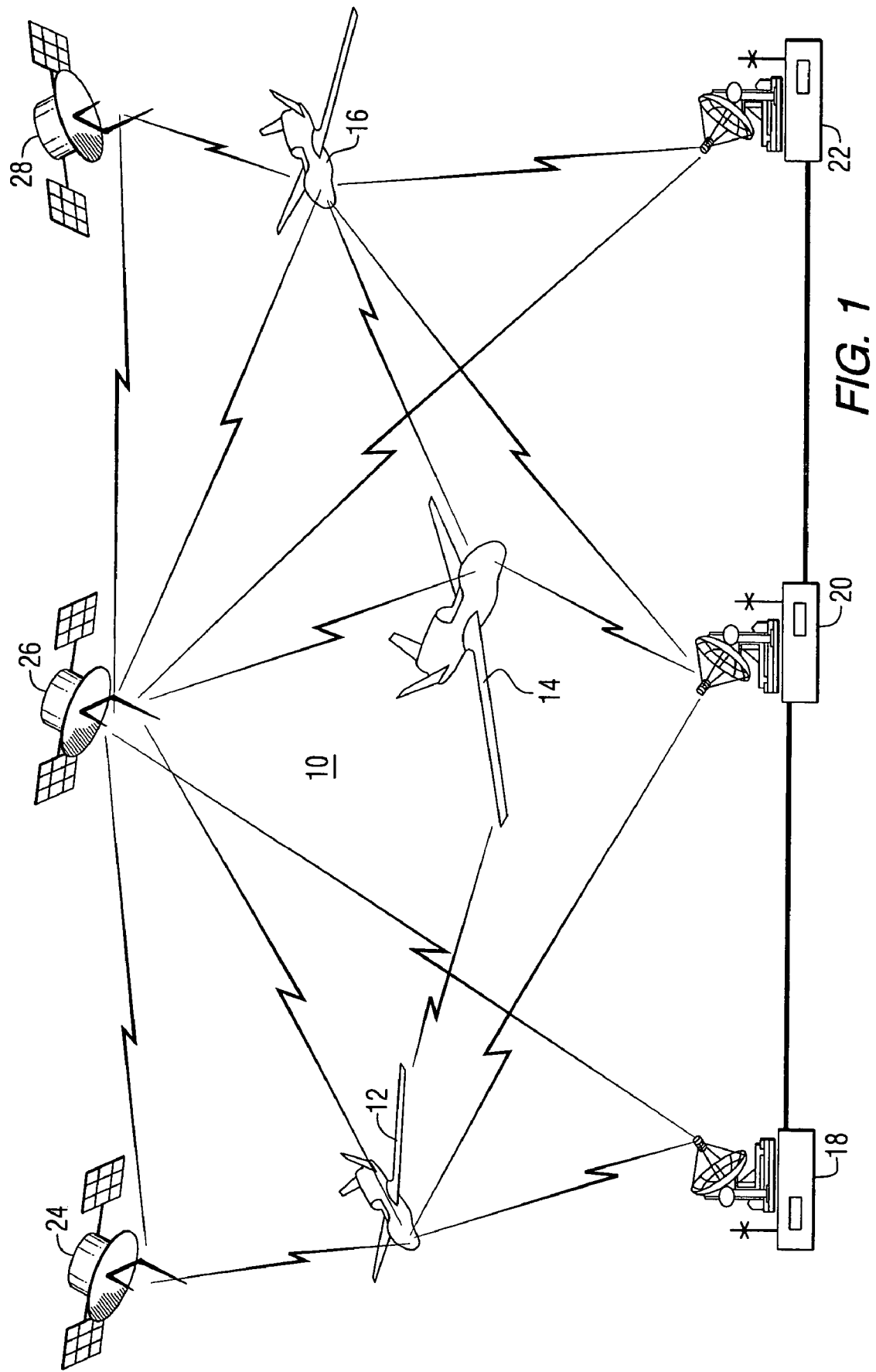
FIG. 1 is a schematic representation of a system that includes components constructed in accordance with this invention.

Referring to the drawings, FIG. 1 is a schematic representation of a system 10 constructed in accordance with this invention. The system includes a plurality of sensor platforms, which can be unmanned air vehicles (UAVs) 12, 14 and 16. Each of the sensor platforms carries one or more sensors for supplying information about an area under surveillance. The UAVs can communicate with a plurality of ground stations 18, 20 and 22, and a plurality of satellites 24, 26 and 28. Communication links are provided among the various system components to achieve the desired functionality.

Figure 2:
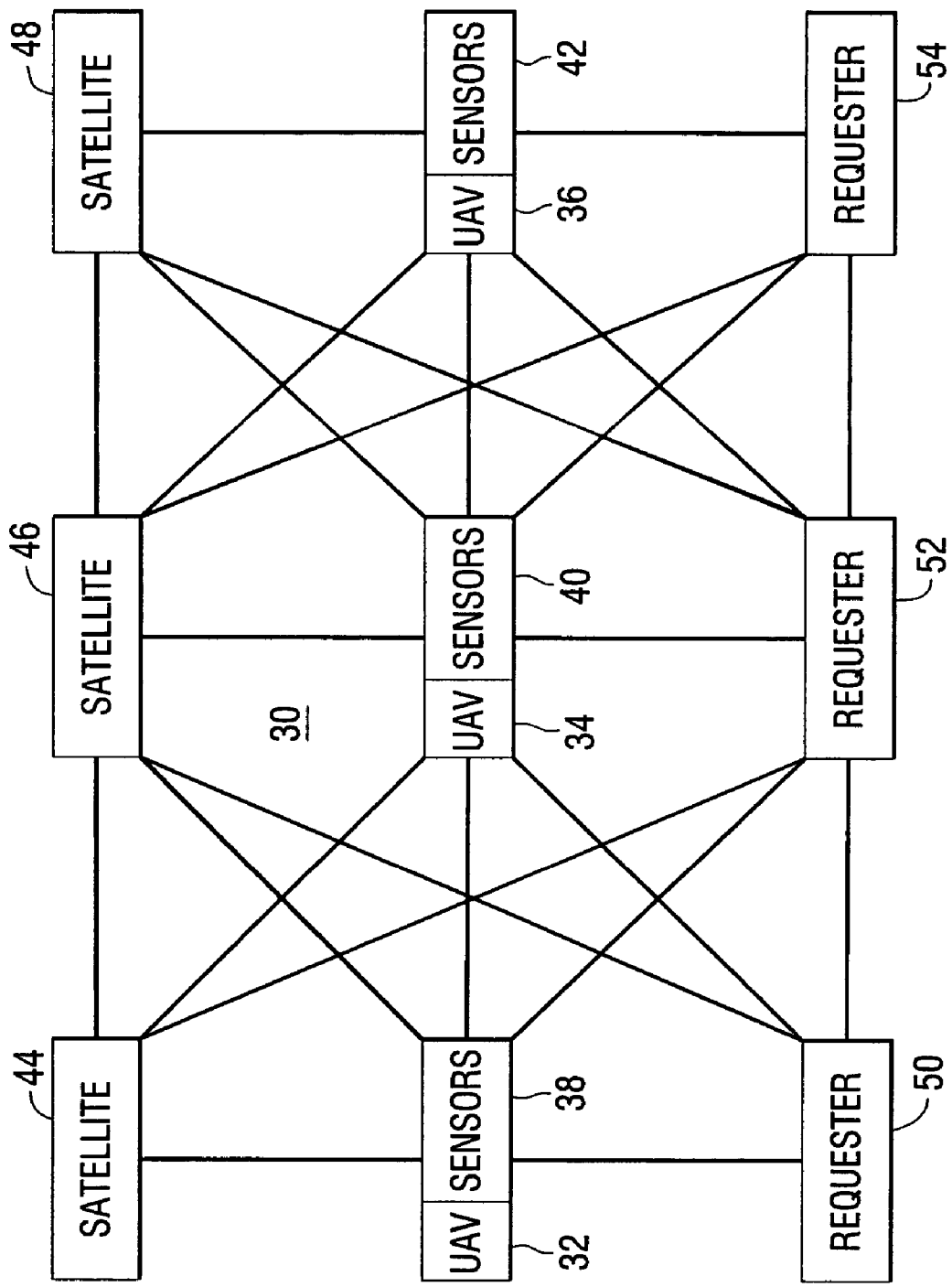
FIG. 2 is a block diagram of a system that can be used to practice the invention.

FIG. 2 is a block diagram of a system 30 that can be used to practice the invention. The system includes a plurality of sensor platforms 32, 34 and 36, which can be the UAVs of FIG. 1. Each sensor platform carries one or more sensors 38, 40 and 42, for collecting information. The sensor platforms also include a computer or processor for receiving requests and determining an efficient way to process the requests, as well as equipment for storing and supplying information. The platforms further include flight control equipment that is used to control the flight of the platforms. Each of the sensor platforms can communicate with one or more satellites 44, 46 and 48 as illustrated by the lines connecting the sensor platforms to the satellites. A plurality of requesters 50, 52 and 54, which can be in the form of the ground stations of FIG. 1, can communicate with the UAVs and the satellites.

The Collaborative Aggregate Situation Awareness (CASA) system optimizes the supply and demand of information in the surveillance system. The UAVs can supply intelligence information such as imagery collected by sensors mounted on the UAVs. The requesters are entities that require the intelligence supplied by the UAVs. The requesters can be human operators or equipment that can communicate with the other system components and/or other requesters. The pathways, or communications links, for transmitting the intelligence can be supplied by satellite links, by direct UAV to requester links, and by links between UAVs. The system optimizes the intelligence gathering process by increasing the tempo of requests and the collection of intelligence, and by positioning of the UAVs in the optimal position for collecting intelligence not yet requested by the requesters and in the optimal position for using the satellites to send the collected data.

Figure 3:
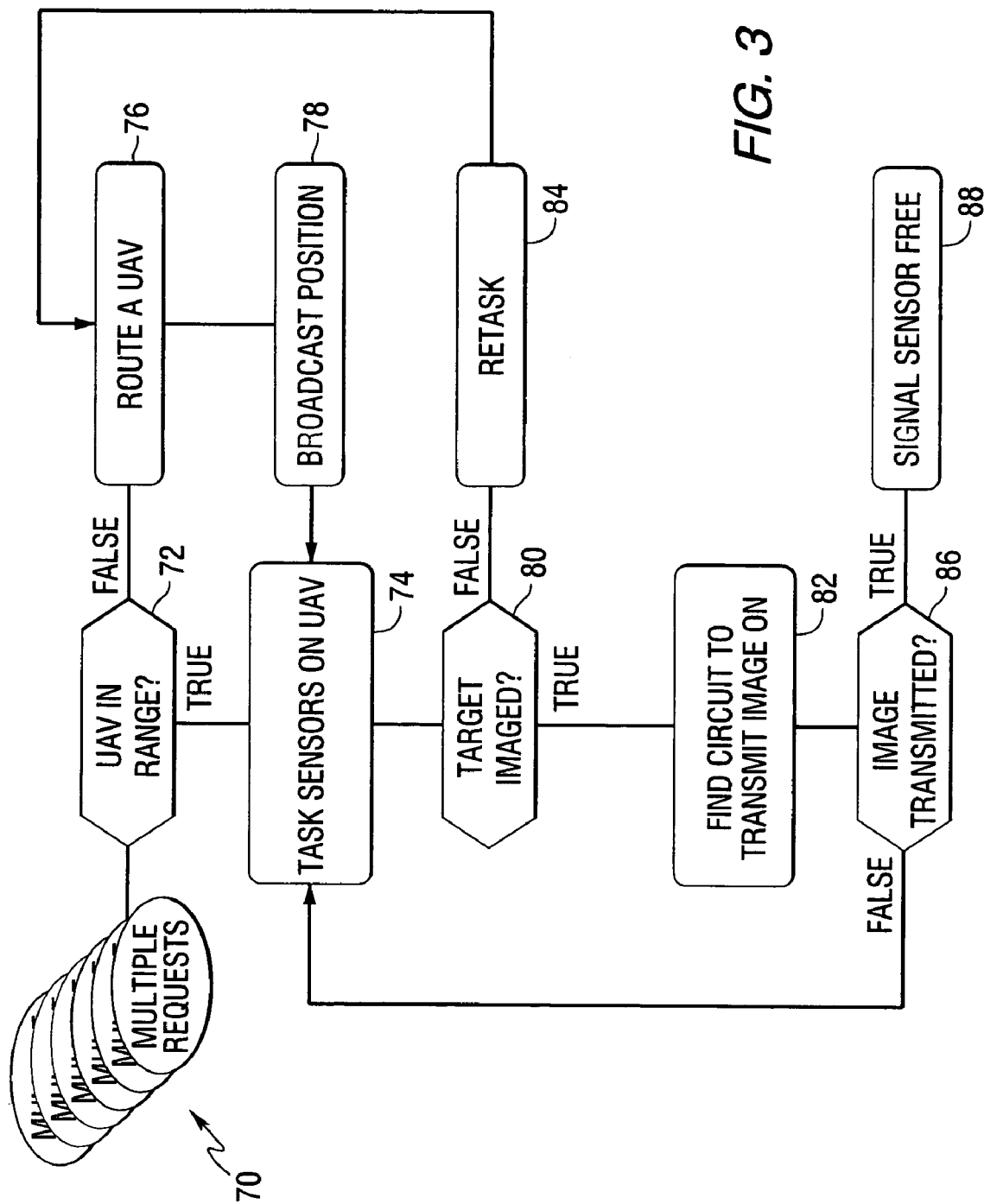
FIG. 3 is a flow diagram that illustrates the operation of the invention.

FIG. 3 is a flow diagram that illustrates the operation of the system. Multiple requests are entered as shown in blocks 70. Block 72 indicates that the system must determine if a UAV is within range of the requester. If the UAV is in a communication mode, its position can be transmitted to a requester. If the UAV is in a silent mode, its position can be predicted. If a UAV is within range, then a sensor on the UAV is accessed as shown in block 74. If a UAV is not within range, then a UAV must be routed to a broadcast position that is within range as illustrated by block 76. Communication can follow any path among the system components, including ground stations, satellites, ground based repeaters, and other UAVs. Once the UAV is in a broadcast position as shown by block 78, then a requester can access the sensor on the UAV. The system determines if a target of interest has been imaged as shown in block 80. Collection status messages for other UAVs can be scanned to determine if the target has been imaged. The collection status messages include a basic encyclopedia number that identifies each of the potential targets. If the target has been imaged, then the system locates a suitable transmission channel as shown in block 82. If the target has not been imaged, then the sensor can be retasked as shown in block 84 and a UAV can be routed to an appropriate broadcast position.

If the image has been transmitted (block 86) then the sensor is free to perform other tasks as illustrated in block 88. If the image data has not been transmitted, then the imaging process is repeated. As used herein, tasking a sensor means to cause a sensor to turn on, actively sense and then transmit or store the sensed data. Retasking a sensor means to take a current set of tasks and inject a new task into this set. The new task may supersede a current task, which may be rescheduled, outsourced or dropped.

The sensors carried by the UAVs can be autonomous sensors. Autonomous sensors may collect imagery proactively before the imagery is requested. Then that imagery can be stored and transmitted upon request. This proactive collection can be triggered by automatic target recognition queuing, a history of requests, or other sensor cross queuing.

A specific instance of supply/demand optimization is the optimization of sensor tasking requests and the collection of the requests by autonomous sensors. An autonomous sensor may proactively collect imagery on any vehicle that radiates a specific frequency. For example, an autonomous sensor may proactively collect imagery of ground moving target indicator (GMTI) tracks that are spaced closely together (which may mean an enemy convoy), or imagery of GMTI tracks that are moving toward friendly lines (which could be a sign of an enemy attack), or imagery of infrared (IR) hot spots detected with the IR sensor (that might be an enemy tank). An autonomous sensor may also listen for a signature sound or spore or scent, and fly upstream taking pictures of the source. The CASA system can efficiently process requests and position the autonomous sensors at the right spot at the right time. This is achieved by the assignment of priorities to requesters, types of requests, and potential areas for requests.

The sensors can be generally referred to as producers, and the information provided by the sensors can be generally referred to as products. CASA provides a means for optimizing the flow of requests to producers and the production of products for the requesters. One embodiment of the invention optimizes the collection of surveillance and reconnaissance data based on collection requests used to task a group of air vehicles. The optimization provides a means for collaborating the positions of the air vehicles, the intents of those air vehicles, the collection objectives of the air vehicles, and the priority of those collection objectives. The "intents" of the air vehicles include the present position, heading, speed and altitude, as well as the next waypoint that the vehicle will fly to, and the next sensor operation it will perform. In one embodiment the system can include specific air vehicles that perform the collection tasks. Additional versions of CASA can provide for the collaboration of air vehicles to form an aggregate used to collect the prioritized collection requests.

The UAVs and ground stations can share sensor position information that is both current and projected, to support proactive optimization. This combines the collaborative knowledge of multiple sensors and the positioning of the sensors.

In one embodiment, the requesters send their tasking requests in the form of an Airborne Collection Request Message (ACRM) to a UAV or to a central site such as the Air Operations Center (AOC) to be forwarded to a UAV. The UAVs will collaborate with each other to swap ACRM taskings to better fit tasking to the position and capability of each UAV. This capability to collaborate the execution of the tasking is a result of the UAV's forming an aggregate that networks the tasking from one UAV to another UAV.

The UAVs share requests with each other. Of particular interest are requests made to a UAV, that it cannot collect due to range or time limitations. By handing these requests to a UAV that is in range of the requested target or a UAV that has enough fuel to reach the requested target, the request can be fulfilled without having to manually retask another UAV with the same request.

Multiple UAV's can execute a single task at the same time. As an example, if a request is made to image an area larger than one UAV can image in the allowed time, then multiple UAVs would image the large area concurrently. A UAV will know it cannot image the whole area by calculating whether the total time required to image the area exceeds its flight time or the time allotted to collect the image. The UAV will then divide the area into a section that it can collect in the allotted time and send the remainder of the request to another UAV for collection. Alternatively, a virtual air vehicle can be formed by flying several UAVs in a formation spread far apart and precisely positioned via a differential global positioning system (DGPS). This prevents moving targets from escaping notice between passes of the sensor. Another scenario may occur when a site must be imaged with a revisit interval that is shorter than a single UAV can accommodate. In this case multiple UAVs would execute the task by imaging one behind the other.

A code can be included in an area imaging request. If this code requires the area to be imaged in a concurrent manner to prevent missing a moving target, then the UAV will recruit other UAVs to link up for a concurrent imaging pass. If a code requests a large area to be imaged within a short time period, the UAV will break up the area and outsource the areas it cannot collect to other UAVs.

The UAVs must be within a broadcast range to be able to communicate with each other or the ground stations or satellites. The best broadcast locations are determined by having a priori knowledge of the location of the ground based receivers, by using a line of sight analysis to receivers on the ground, and/or by ephemeris analysis of the position of orbiting receivers in the sky. The time, range, and position parameters are calculated to determine the area for the best reception and/or transmission of signals from the UAVs that is also near the areas that are tasked for collection.

Any type of sensor may be used. This may include electro-optical (EO), infrared (IR), or synthetic aperture radar (SAR) sensors that may be used for collecting intelligence on sites at known locations. Detecting sensors may also be used. Detecting sensors would be used to determine where to search for sites to image. Using conventional detecting and sensing equipment, a detector may be used to aim the sensor. For example if a radio truck emits a signal, the detector will focus the sensor on the truck with one shot rather than having to search visually for the truck. Newer devices incorporate both detectors and sensors. For example there are newer radars that can detect motion over a broad area and focus a high resolution beam on areas with movement, all with the same device.

In addition to imaging sensors, a collecting sensor may be a radio signal receiver or a biological or chemical sensor or even a sound sensor. Once a scent, spore, signal, or other signature has been detected, a finding mode is enacted to determine the location of the site to image. This process includes the cross correlation of multiple UAVs via a collaborative aggregate situation awareness for the multiple UAVs. For example, UAV1 may know that a site with signature X was detected at 90 degrees, while UAV2 may know that signature X was detected at 180 degrees, and UAV3 may know that signature X was detected at 0 degrees. If all UAVs know the positions of each other, then the combination of the 3 vectors from the 3 UAVs can be used to direct the UAVs to an area of high probability for having the target of interest. This can promote a cross cueing of the EO/IR/SAR sensors, wherein one sensor is used to aim another sensor.

Multiple requesters may communicate with the same UAV at the same time. The UAV can handle multiple requests by the usage of an email-like facility that permits multiple requesters to send multiple requests to the same UAV. The UAV can then make use of a priority and precedence scheme to determine the order for collecting the requests and to determine which requests should be outsourced to another UAV.

The system may not currently "know" if the correct target has been imaged. The system assumes that the correct target has been imaged by the fact that it pointed the proper sensor at the target location and was able to get data to transmit. Automatic Target Recognition (ATR) and Automatic Signature Confirmation (ASC) can be added to the system to improve the knowledge that the proper target has been imaged.

Several methods can be used to preposition the UAVs prior to tasking. Kill box assignment can be used by assigning a UAV to a designated area to loiter until it is tasked. Probability assignment can also be used to preposition the UAV in an area that had the most previous requests. When in the probability mode, multiple UAVs can collaborate to spread themselves out across the area of high request probability.

Requests can specify, for example, that an image is to be taken at a particular latitude/longitude/elevation, in a particular direction, and with a particular National Imagery Interpretability Rating Scale (NIIRS). UAV positions can be self reported by the UAVs via a Situation Awareness (SA) message. The UAVs know their position through an onboard global positioning system (GPS). UAVs collaborate positions via the SA Message. The SA message contains the tail number, location, and time of the report. The SA message can also include the near term sensor status for each sensor.

Available communications channels are known via a communications (COMM) plan that is sent to the UAVs, and identifies where the COMM assets will be located. The channel characteristics, frequencies, and bandwidths are transmitted as part of the COMM plan. If a UAV gets in a position that is outside of the COMM channel, then a contingency is raised and the UAV is directed to a path that will intersect an active COMM channel or return the UAV back to a base.

Autonomous sensors can be given goals for sensing rather than locations to image. An autonomous sensor can be assigned to an area to roam and hunt in, with a goal of collecting imagery with a specific signature. The UAV can form a surveillance pattern and roam an area trying to detect the signature of the goal. For example the UAV may be tasked to take pictures of speeding drivers between Los Angeles and Las Vegas. The UAV would form a surveillance pattern by flying over the freeway between Los Angeles and Las Vegas. The UAV would set its ground moving target indicator synthetic aperture radar (GMTI SAR) sensor to form GMTI tracks on all objects traveling greater than 75 mph (avoiding legal drivers) and less than 190 mph (avoiding aircraft tracks). Once GMTI forms a track, the UAV will then slew an electro-optical sensor onto the target, snap a picture, and transmit it to the proper authority. Then the sensor would revert back to the search mode to search for another speeder.

Another example may be finding and imaging air defense sites. The UAVs may deploy in a rabbit and hunter mode. A "rabbit" UAV will fly lower and make broadcasts that will stimulate the air defense site to turn on radars or launch missiles. The "hunter" UAV at a higher, more survivable, altitude will follow the "rabbit" UAV and image the sites that are flushed out by the "rabbit" UAV.

To provide for efficient collection and communication of information, the UAVs can be directed to sweet spot positions. Sweet spot positions are determined by calculating the intersection of multiple constraints. An example may be that COMM coverage is available in an area identified as ABCD, while designated loiter areas are BCD, and high probability targets are located in area BDEF, but areas DMN are closest to home base. So the spot that is the intersection of COMM, Loiter, Probable Targets, and Home Base is area D.

The increase in the tempo of requests and the collection of intelligence is an important feature of CASA. In the traditional method of intelligence collection, an intelligence agency will send requests to the AOC. The AOC will determine which ACRMs to forward to a ground segment. The ground segment will plan the collection and load the collection on the UAV, and the UAV will collect the intelligence. In the systems of this invention, the intelligence agency will send its requests directly to the UAV. The UAV will plan its own collection. Requests that are outside of the UAV's range or capacity are forwarded to another UAV. The UAV then plans a route to achieve the collection. The route can be sent to a human pilot to check for flight safety. The UAV collects the imagery and sends it to the group designated to receive the intelligence. This eliminates several steps that were used in previous systems. Rather than spending a day or more getting the intelligence, the tempo is sped up to a matter of minutes.

The optimization of supply and demand is achieved via a "transparent policy". A transparent policy is a system implementation that allows for soft business rules to be set for the precedence and priority for the collection and dissemination, or the supply and demand, of the intelligence. As an example, User A has precedence High, User B has precedence Low, and User C has precedence Mid. Each user may assign a priority of Urgent, Important, or Routine to each request it makes. In one scenario, each user always puts Urgent on everything. So a soft business rule is instituted that collects images based on the requester's precedence. In another scenario, each user has a few Urgent requests, some Important requests, and many Routine requests. In this case a soft business rule is used to collect images based on the User's assigned priority with User precedence used to break ties between conflicting requests.

The CASA system can provide each requester with a Situation Awareness (SA) display that provides an easy to understand representation of how each UAV is tasked, that is, which sensor will be active when and where. This provides each requester with the opportunity to avoid tasking a UAV if it is already loaded with Urgent requests and likewise it provides each requester with the opportunity to load tasking on under-utilized UAVs.

A request might be deemed Urgent if people's lives or battle assets are in danger, for example, if an enemy is actively engaging troops, or if intelligence is required to reduce fratricide in an air strike. A request might be deemed Important if the failure to collect the information may result in an Urgent problem, for example, if an enemy is preparing to engage troops. A request might be deemed Routine if it involves observations made to collect logistical information on enemy movements, for example, enemy ship yard images showing stages and progress of enemy asset development.

Collection objectives can be collaborated by first grossly dividing the objectives by the sensor capability of each UAV with each request for that sensor type, then categorizing the objectives geographically, by which UAV is closest, or by which UAV can reposition itself to be closer to the objective. For objectives that are larger than one UAV's capability, multiple UAVs will be tasked as a multiple vehicle aggregate to collect the objective.

This invention provides an apparatus and method for optimizing the flow of requests to producers and to optimize the flow of products to the requesters. The sensors can be proactively positioned in areas with the highest probability to satisfy requester's future requests.

While the present invention has been described in terms of several embodiments, it will be apparent to those skilled in the art that various changes can be made to the disclosed embodiments without departing from the scope of the invention as defined by the following claims.

What is claimed is:

1. A surveillance method comprising the steps of:
    sending information requests to one or more of a plurality of unmanned airborne platforms, each carrying one or more sensors for gathering information;
    coordinating processing of the requests among the plurality of airborne platforms; and
    transmitting responses to the requests to one or more requesters.

2. The method of claim 1, wherein the step of coordinating processing of the requests among the plurality of airborne platforms comprises the steps of:
    determining whether a first one of the airborne platforms can process the requests; and
    if the first airborne platform can process the requests, using the first airborne platform to process the requests; or if the first airborne platform cannot process the requests, transferring the request to a second one of the airborne platforms.

3. The method of claim 1, wherein the step of coordinating processing of the requests among the plurality of airborne platforms comprises the steps of:
    determining whether a first one of the airborne platforms can process a portion of the requests; and
    if the first airborne platform can process a portion of the requests, using the first airborne platform to process the portion of the requests; and transferring tasking for a remainder of the requests to a second one of the airborne platforms.

4. The method of claim 1, wherein the step of coordinating processing of the requests among the plurality of airborne platforms comprises the step of:
    using two or more of the airborne platforms to process the requests by gathering information sequentially or simultaneously.

5. The method of claim 1, wherein the step of coordinating processing of the requests among the plurality of airborne platforms comprises the step of:
    processing the requests in accordance with a priority assigned to the requests and a precedence assigned to the requester.

6. The method of claim 1, further comprising the step of:
    assigning the airborne platforms to designated areas before the airborne platforms are tasked.

7. The method of claim 6, wherein the step of assigning the airborne platforms to designated areas is based on a number of previous requests.

8. The method of claim 6, wherein the step of assigning the airborne platforms to designated areas comprises the step of:
    spreading multiple ones of the airborne platforms across an area of high request probability.

9. The method of claim 6, wherein the airborne platforms are assigned to an area to collect imagery with a specific signature.

10. The method of claim 6, wherein the airborne platforms are assigned to sweet spot positions determined by calculating an intersection of multiple constraints.

11. The method of claim 1, further comprising the step of:
    reporting the status of the airborne platforms to requesters using a situation awareness message that includes information relating to the status of sensors on the airborne platforms.

12. The method of claim 1, the step of coordinating processing of the requests among the plurality of airborne platforms comprises the step of:
    assigning requests to the airborne platforms based on sensor capability and the location of objectives of the requests.

13. The method of claim 1, wherein the step of coordinating processing of the requests among the plurality of airborne platforms comprises the step of:
    combining information gathered from at least two of the airborne platforms to cross cue sensors on the airborne platforms.

14. A surveillance system comprising:
    a plurality of unmanned airborne platforms, each carrying one or more sensors for gathering information;
    a first plurality of communications links for transmitting a plurality of requests to the airborne platforms and for sending information to a plurality of requesters; and a second plurality of communications links for transmitting and receiving information between the plurality of airborne platforms to coordinate collection of data by the sensors.

15. The surveillance system of claim 14, wherein at least one of the sensors comprises an autonomous sensor.

16. The surveillance system of claim 14, including a processor for determining an order for collecting the requests according to a priority and precedence scheme.

17. The surveillance system of claim 14, wherein the airborne platforms include a processor for determining which requests should be outsourced to another airborne platform.

18. The surveillance system of claim 14, wherein the airborne platforms include a global positioning system receiver.

19. The surveillance system of claim 14, wherein the airborne platforms include a transmitter for transmitting information on the first and second communications links, and a receiver for receiving information on the first and second communications links.

* * * * *